US009429275B2

(12) United States Patent
Long et al.

(10) Patent No.: US 9,429,275 B2
(45) Date of Patent: Aug. 30, 2016

(54) CLOGGED FILTER DETECTION SYSTEM AND METHOD

(71) Applicant: Allison Transmission, Inc., Indianapolis, IN (US)

(72) Inventors: Charles F. Long, Pittsboro, IN (US); Charles T. Taylor, Indianapolis, IN (US); William J. Summers, Plainfield, IN (US); Duane E. Colter, Plainfield, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 564 days.

(21) Appl. No.: 13/735,383

(22) Filed: Jan. 7, 2013

(65) Prior Publication Data
US 2013/0125995 A1 May 23, 2013

Related U.S. Application Data

(63) Continuation of application No. PCT/US2012/027847, filed on Mar. 6, 2012.

(60) Provisional application No. 61/451,648, filed on Mar. 11, 2011.

(51) Int. Cl.
*F16N 29/00* (2006.01)
*F17D 1/00* (2006.01)
(Continued)

(52) U.S. Cl.
CPC . *F17D 1/00* (2013.01); *B60K 6/48* (2013.01); *B60W 10/30* (2013.01); *B60W 20/50* (2013.01);
(Continued)

(58) Field of Classification Search
CPC ............................ F16H 57/04; F16H 61/0031
USPC ............................................ 137/544; 60/422
See application file for complete search history.

(56) References Cited

U.S. PATENT DOCUMENTS 2,012,082 A * 8/1935 Hieber .................. B60W 10/02
184/6.14
2,374,822 A 5/1945 Claire
(Continued)

FOREIGN PATENT DOCUMENTS

DE 3519026 4/1986
DE 10 2005 015911 A1 10/2006
(Continued)

OTHER PUBLICATIONS

European Search Report dated Oct. 8, 2014 EP12802017.9.
(Continued)

*Primary Examiner* — Kevin Murphy
*Assistant Examiner* — Angelisa L Hicks
(74) *Attorney, Agent, or Firm* — Woodard Emhardt Moriarty McNett & Henry LLP

(57) ABSTRACT

A hydraulic system for a hybrid module which is located between an engine and a transmission includes a parallel arrangement of a mechanical pump and an electric pump. Each pump is constructed and arranged to deliver oil to other portions of the hydraulic system depending on the operational mode. Three operational modes are described including an electric mode, a transition mode, and a cruise mode. Included is a lube splitter valve which prioritizes the delivery of oil between downstream components and the motor (eMachine). The motor temperature is monitored and an elevated motor temperature provides an indication of a clogged oil filter.

25 Claims, 9 Drawing Sheets

(51) Int. Cl.
*B60K 6/48* (2007.10)
*B60W 10/30* (2006.01)
*B60W 20/00* (2016.01)
*F16H 57/04* (2010.01)
*B60K 17/28* (2006.01)
*B60K 25/00* (2006.01)
*B60K 25/02* (2006.01)

(52) U.S. Cl.
CPC ............ *F16H 57/0404* (2013.01); *B60K 17/28* (2013.01); *B60K 2025/005* (2013.01); *B60K 2025/022* (2013.01); *B60W 2510/087* (2013.01); *B60Y 2306/05* (2013.01); *F16H 57/0445* (2013.01); *F16H 57/0476* (2013.01); *Y02T 10/6221* (2013.01); *Y10T 137/0318* (2015.04); *Y10T 137/794* (2015.04)

(56) References Cited

U.S. PATENT DOCUMENTS

| | | | |
|---|---|---|---|
| 2,759,608 A | 8/1956 | Miller | |
| 3,025,718 A | 3/1962 | Christenson | |
| 3,334,705 A * | 8/1967 | Lam | F15B 11/16 137/118.06 |
| 3,800,913 A | 4/1974 | Schmitt | |
| 3,863,739 A | 2/1975 | Schaefer et al. | |
| 4,584,487 A | 4/1986 | Hesse et al. | |
| 4,838,126 A | 6/1989 | Wilfinger et al. | |
| 5,019,757 A | 5/1991 | Beifus | |
| 5,121,714 A | 6/1992 | Susa et al. | |
| 5,209,110 A | 5/1993 | Sano et al. | |
| 5,217,085 A | 6/1993 | Barrie et al. | |
| 5,251,440 A * | 10/1993 | Bong-dong | E02F 9/226 123/179.3 |
| 5,347,821 A | 9/1994 | Oltman et al. | |
| 5,362,206 A | 11/1994 | Westerman et al. | |
| 5,415,603 A | 5/1995 | Tuzuki et al. | |
| 5,447,414 A | 9/1995 | Nordby et al. | |
| 5,606,946 A | 3/1997 | Data et al. | |
| 5,669,464 A | 9/1997 | Earleson | |
| 5,724,878 A * | 3/1998 | Stolle | B60J 7/1273 296/117 |
| 5,736,823 A | 4/1998 | Nordby et al. | |
| 5,752,482 A | 5/1998 | Roettgen et al. | |
| 5,823,282 A | 10/1998 | Yamaguchi | |
| 5,895,099 A | 4/1999 | Diecke et al. | |
| 5,944,632 A | 8/1999 | Hara et al. | |
| 6,082,322 A | 7/2000 | Graham | |
| 6,172,602 B1 | 1/2001 | Hasfjord | |
| 6,209,672 B1 | 4/2001 | Severinsky | |
| 6,223,763 B1 * | 5/2001 | Meyer et al. | 137/118.01 |
| 6,244,825 B1 | 6/2001 | Sasaki et al. | |
| 6,292,731 B1 | 9/2001 | Kirchhoffer et al. | |
| 6,305,664 B1 | 10/2001 | Holmes et al. | |
| 6,390,947 B1 * | 5/2002 | Aoki et al. | 477/3 |
| 6,527,074 B1 * | 3/2003 | Morishita | 180/65.1 |
| 6,607,142 B1 | 8/2003 | Boggs et al. | |
| 6,638,022 B2 | 10/2003 | Shimabukuro et al. | |
| 6,647,326 B2 | 11/2003 | Nakamori et al. | |
| 6,716,138 B2 | 4/2004 | Matsubara et al. | |
| 7,041,030 B2 * | 5/2006 | Kuroda et al. | 477/21 |
| 7,055,486 B2 | 6/2006 | Hoff et al. | |
| 7,082,758 B2 | 8/2006 | Kageyama et al. | |
| 7,117,120 B2 | 10/2006 | Beck et al. | |
| 7,168,924 B2 | 1/2007 | Beck et al. | |
| 7,174,876 B2 | 2/2007 | Suzuki et al. | |
| 7,192,518 B2 * | 3/2007 | Roesgen | 210/149 |
| 7,255,214 B2 | 8/2007 | Long et al. | |
| 7,285,066 B2 | 10/2007 | Long et al. | |
| 7,288,039 B2 | 10/2007 | Foster et al. | |
| 7,395,803 B2 | 7/2008 | Ledger et al. | |
| 7,396,306 B2 | 7/2008 | Long et al. | |
| 7,427,914 B2 | 9/2008 | Plantamura | |
| 7,481,053 B2 | 1/2009 | Kitano et al. | |
| 7,543,695 B2 | 6/2009 | Redelman et al. | |
| 7,556,120 B2 | 7/2009 | Sah et al. | |
| 7,558,699 B2 | 7/2009 | Beck et al. | |
| 7,651,427 B2 | 1/2010 | Long et al. | |
| 7,779,958 B2 | 8/2010 | Kitano et al. | |
| 7,946,389 B2 | 5/2011 | Kakinami et al. | |
| 2002/0177960 A1 | 11/2002 | Berndorfer | |
| 2003/0059310 A1 | 3/2003 | Koenig et al. | |
| 2004/0062658 A1 | 4/2004 | Beck et al. | |
| 2004/0192502 A1 | 9/2004 | Suzuki et al. | |
| 2005/0031443 A1 | 2/2005 | Ohlsson et al. | |
| 2005/0064975 A1 * | 3/2005 | Takagi et al. | 475/101 |
| 2007/0173373 A1 | 7/2007 | Kinugasa et al. | |
| 2007/0240919 A1 * | 10/2007 | Carlson | 180/53.4 |
| 2007/0284176 A1 * | 12/2007 | Sah et al. | 180/305 |
| 2007/0289816 A1 * | 12/2007 | Inoue et al. | 184/6 |
| 2008/0017472 A1 | 1/2008 | Redelman et al. | |
| 2008/0067116 A1 | 3/2008 | Anderson et al. | |
| 2008/0121464 A1 | 5/2008 | Ledger et al. | |
| 2008/0260541 A1 | 10/2008 | Lifson et al. | |
| 2008/0308355 A1 * | 12/2008 | Kakinami et al. | 184/27.2 |
| 2009/0014245 A1 | 1/2009 | Shevchenko et al. | |
| 2009/0107755 A1 | 4/2009 | Kothari et al. | |
| 2009/0116155 A1 | 5/2009 | Almalki et al. | |
| 2009/0118878 A1 | 5/2009 | Park | |
| 2009/0235657 A1 | 9/2009 | Rampen et al. | |
| 2009/0247353 A1 | 10/2009 | Tryon et al. | |
| 2009/0247355 A1 | 10/2009 | Tryon et al. | |
| 2009/0253552 A1 | 10/2009 | Foster | |
| 2009/0259381 A1 | 10/2009 | Wilson et al. | |
| 2009/0276119 A1 | 11/2009 | Barker et al. | |
| 2010/0074767 A1 * | 3/2010 | Nelson et al. | 417/292 |
| 2010/0083730 A1 | 4/2010 | Le et al. | |
| 2010/0125023 A1 | 5/2010 | List et al. | |
| 2010/0229824 A1 | 9/2010 | Matsuo et al. | |
| 2010/0332089 A1 | 12/2010 | Gianone et al. | |
| 2011/0000332 A1 | 1/2011 | Gianone et al. | |
| 2011/0039657 A1 | 2/2011 | Gibson et al. | |
| 2011/0135500 A1 | 6/2011 | Kaimer et al. | |
| 2013/0018605 A1 | 1/2013 | Peterson | |

FOREIGN PATENT DOCUMENTS

| | | |
|---|---|---|
| DE | 10 2007 004964 A1 | 8/2008 |
| EP | 0515326 | 11/1992 |
| GB | 1471305 | 4/1977 |
| GB | 2 046 376 A | 11/1980 |
| GB | 2402720 | 2/2007 |
| JP | 56-003307 A | 1/1981 |
| JP | 2000337119 A | 5/2000 |
| JP | 2004-067001 | 3/2004 |
| KR | 2005038168 | 4/2005 |
| KR | 10-1039579 B1 | 6/2011 |

OTHER PUBLICATIONS

International Search Report and Written Opinion issued in PCT/US2012/024119, dated Aug. 22, 2012.
International Search Report and Written Opinion issued in PCT/US2012/025451, dated Aug. 27, 2012.
International Search Report and Written Opinion issued in PCT/US2012/025457, dated Dec. 26, 2012.
International Search Report and Written Opinion issued in PCT/US2012/027847, mailed Sep. 26, 2012.
International Search Report and Written Opinion issued in PCT/US2012/043432, dated Oct. 23, 2012.
European Supplemental Search Report for European Patent Application No. 12757971.2 dated Aug. 4, 2014.

* cited by examiner

CLOGGED FILTER DETECTION SYSTEM AND METHOD

REFERENCE TO RELATED APPLICATIONS

This application claims the benefit of PCT Application No. PCT/US2012/027847, filed Mar. 6, 2012 which claims the benefit of U.S. Provisional Application No. 61/451,648, filed Mar. 11, 2011, both of which are hereby incorporated by reference.

BACKGROUND OF THE INVENTION

With the growing concern over global climate change as well as oil supplies, there has been a recent trend to develop various hybrid systems for motor vehicles. While numerous hybrid systems have been proposed, the systems typically require significant modifications to the drive trains of the vehicles. These modifications make it difficult to retrofit the systems to existing vehicles. Moreover, some of these systems have a tendency to cause significant power loss, which in turn hurts the fuel economy for the vehicle. Thus, there is a need for improvement in this field.

One of the areas for improvement is in the construction and arrangement of the hydraulic system. Hybrid vehicles, and in particular the hybrid module associated with such a vehicle, have various lubrication and cooling needs which depend on engine conditions and operational modes. In order to address these needs, oil is delivered by at least one hydraulic pump. The operation of each hydraulic pump is controlled, based in part on the lubrication and cooling needs and based in part on the prioritizing when one or more hydraulic pump is included as part of the hydraulic system of the hybrid vehicle. The prioritizing between hydraulic pumps is based in part on the needs and based in part on the operational state or mode of the hybrid vehicle.

A further area for improvement relates to the delivery of filtered fluid, such as oil, to downstream locations such as the forward and rear bearings and to the motor sleeve, secondly, if the supply of oil is sufficient. If the filter is clogged to an extent that the supply of oil is not sufficient for all downstream requirements, then prioritizing is required and some type of clogged filter detection is desired.

SUMMARY

The hydraulic system (and method) described herein is part of a hybrid module used within a hybrid system adapted for use in vehicles and suitable for use in transportation systems and into other environments. The cooperating hybrid system is generally a self-contained and self-sufficient system which is able to function without the need to significantly drain resources from other systems in the corresponding vehicle or transportation system. The hybrid module includes an electric machine (eMachine).

This self-sufficient design in turn reduces the amount of modifications needed for other systems, such as the transmission and lubrication systems, because the capacities of the other systems do not need to be increased in order to compensate for the increased workload created by the hybrid system. For instance, the hybrid system incorporates its own lubrication and cooling systems that are able to operate independently of the transmission and the engine. The fluid circulation system which can act as a lubricant, hydraulic fluid, and/or coolant, includes a mechanical pump for circulating a fluid, along with an electric pump that supplements workload for the mechanical pump when needed. As will be explained in further detail below, this dual mechanical/electric pump system helps to reduce the size and weight of the required mechanical pump, and if desired, also allows the system to run in a complete electric mode in which the electric pump solely circulates the fluid.

One of the hydraulic system features described herein is the use of a lube splitter valve which enables the prioritizing of the available oil to downstream locations. The first priority for the available (filtered) oil is for lubrication and cooling of forward and rear bearings, gears, and/or other accessories which require or would benefit from such lubrication and/or cooling. The second priority, once the first priority has been satisfied, is oil delivery to the motor sleeve and, from there, to the motor (eMachine). The lube splitter valve, also referred to as a lube regulator valve, controls the flow split and the delivery prioritizing. In the event the filter (upstream from the lube splitter valve) becomes clogged and the oil delivery is reduced, the motor may not receive sufficient cooling and a temperature rise can be sensed as an indication of a clogged filter condition.

The described hydraulic system (for purposes of the exemplary embodiment) is used in conjunction with a hybrid electric vehicle (HEV). Included as part of the described hydraulic system is a parallel arrangement of a mechanical oil pump and an electric oil pump. The control of each pump and the sequence of operation of each pump depends in part on the operational state or the mode of the hybrid vehicle. Various system modes are described herein relating to the hybrid vehicle. As for the hydraulic system disclosed herein, there are three modes which are specifically described and these three modes include an electric mode (eMode), a transition mode, and a cruise mode.

As will be appreciated from the description which follows, the described hydraulic system (and method) is constructed and arranged for addressing the need for component lubrication and for cooling those portions of the hybrid module which experience an elevated temperature during operation of the vehicle. The specific construction and operational characteristics provide an improved hydraulic system for a hydraulic module.

The compact design of the hybrid module has placed demands and constraints on a number of its subcomponents, such as its hydraulics and the clutch. To provide an axially compact arrangement, the piston for the clutch has a recess in order to receive a piston spring that returns the piston to a normally disengaged position. The recess for the spring in the piston creates an imbalance in the opposing surface areas of the piston. This imbalance is exacerbated by the high centrifugal forces that cause pooling of the fluid, which acts as the hydraulic fluid for the piston. As a result, a nonlinear relationship for piston pressure is formed that makes accurate piston control extremely difficult. To address this issue, the piston has an offset section so that both sides of the piston have the same area and diameter. With the areas being the same, the operation of the clutch can be tightly and reliably controlled. The hydraulics for the clutch also incorporate a spill over feature that reduces the risk of hydrostatic lock, while at the same time ensures proper filling and lubrication.

In addition to acting as the hydraulic fluid for the clutch, the hydraulic fluid also acts as a coolant for the eMachine as well as other components. The hybrid module includes a sleeve that defines a fluid channel that encircles the eMachine for cooling purposes. The sleeve has a number of spray channels that spray the fluid from the fluid channel onto the windings of the stator, thereby cooling the windings, which tend to generally generate the majority of the heat for the eMachine. The fluid has a tendency to leak from the hybrid module and around the torque converter. To prevent power loss of the torque converter, the area around the torque converter should be relatively dry, that is, free from the fluid. To keep the fluid from escaping and invading the torque converter, the hybrid module includes a dam and slinger arrangement. Specifically, the hybrid module has a impeller blade that propels the fluid back into the eMachine through a window or opening in a dam member. Subsequently, the fluid is then drained into the sump so that it can be scavenged and recirculated.

The hybrid module has a number of different operational modes. During the start mode, the battery supplies power to the eMachine as well as to the electric pump. Once the pump achieves the desired oil pressure, the clutch piston is stroked to apply the clutch. With the clutch engaged, the eMachine applies power to start the engine. During the electro-propulsion only mode the clutch is disengaged, and only the eMachine is used to power the torque converter. In the propulsion assist mode, the engine's clutch is engaged, and the eMachine acts as a motor in which both the engine and eMachine drive the torque converter. While in a propulsion-charge mode, the clutch is engaged, and the internal combustion engine solely drives the vehicle. The eMachine is operated in a generator mode to generate electricity that is stored in the energy storage system. The hybrid module can also be used to utilize regenerative braking (i.e., regenerative charging). During regenerative braking, the engine's clutch is disengaged, and the eMachine operates as a generator to supply electricity to the energy storage system. The system is also designed for engine compression braking, in which case the engine's clutch is engaged, and the eMachine operates as a generator as well.

In addition, the system is also designed to utilize both power takeoff (PTO) and electronic PTO (ePTO) modes in order to operate ancillary equipment such as cranes, refrigeration systems, hydraulic lifts, and the like. In a normal PTO mode, the clutch and the PTO system are engaged, and the internal combustion engine is then used to power the ancillary equipment. In an ePTO state, the clutch is disengaged and the eMachine acts as a motor to power the ancillary equipment via the PTO. While in the PTO or ePTO operational modes, the transmission can be in neutral or in gear, depending on the requirements.

Further forms, objects, features, aspects, benefits, advantages, and embodiments of the present invention will become apparent from a detailed description and drawings provided herewith.

DETAILED DESCRIPTION

Figure 1:
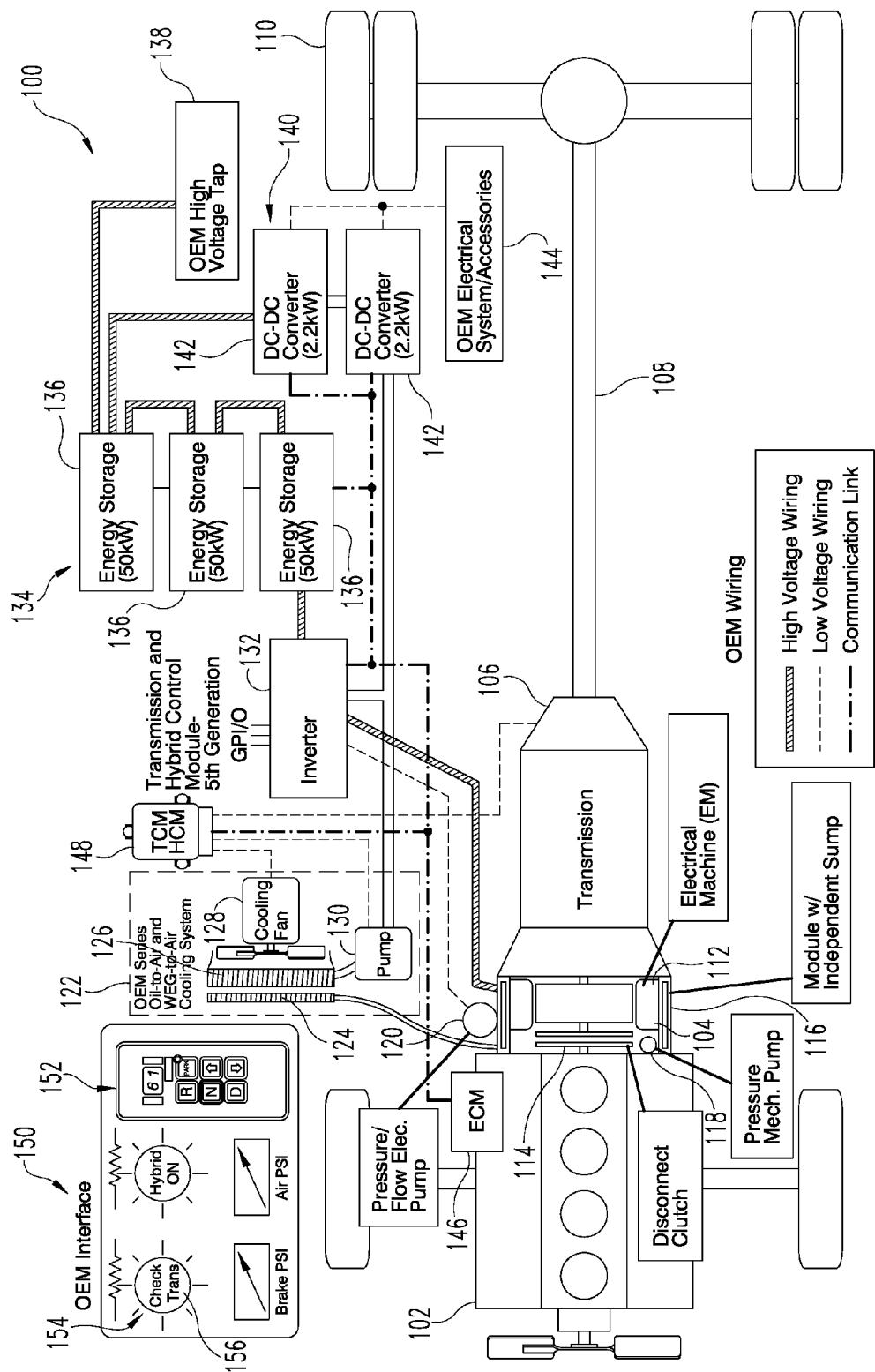
FIG. 1 illustrates a diagrammatic view of one example of a hybrid system.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

FIG. 1 shows a diagrammatic view of a hybrid system 100 according to one embodiment. The hybrid system 100 illustrated in FIG. 1 is adapted for use in commercial-grade trucks as well as other types of vehicles or transportation systems, but it is envisioned that various aspects of the hybrid system 100 can be incorporated into other environments. As shown, the hybrid system 100 includes an engine 102, a hybrid module 104, an automatic transmission 106, and a drive train 108 for transferring power from the transmission 106 to wheels 110. The hybrid module 104 incorporates an electrical machine, commonly referred to as an eMachine 112, and a clutch 114 that operatively connects and disconnects the engine 102 with the eMachine 112 and the transmission 106.

The hybrid module 104 is designed to operate as a self-sufficient unit, that is, it is generally able to operate independently of the engine 102 and transmission 106. In particular, its hydraulics, cooling and lubrication do not directly rely upon the engine 102 and the transmission 106. The hybrid module 104 includes a sump 116 that stores and supplies fluids, such as oil, lubricants, or other fluids, to the hybrid module 104 for hydraulics, lubrication, and cooling purposes. While the terms oil or lubricant or lube will be used interchangeably herein, these terms are used in a broader sense to include various types of lubricants, such as natural or synthetic oils, as well as lubricants having different properties. To circulate the fluid, the hybrid module 104 includes a mechanical pump 118 and an electric pump 120 in cooperation with a hydraulic system 200 (see FIG. 2). With this parallel combination of both the mechanical pump 118 and electric pump 120, the overall size and, moreover, the overall expense for the pumps is reduced. The electric pump 120 cooperates with the mechanical pump 118 to provide extra pumping capacity when required. The electric pump 120 is also used for hybrid system needs when there is no drive input to operate the mechanical pump 118. In addition, it is contemplated that the flow through the electric pump 120 can be used to detect low fluid conditions for the hybrid module 104. In one example, the electric pump 120 is manufactured by Magna International Inc. of Aurora, Ontario, Canada (part number 29550817), but it is contemplated that other types of pumps can be used.

The hybrid system 100 further includes a cooling system 122 that is used to cool the fluid supplied to the hybrid module 104 as well as the water-ethylene-glycol (WEG) to various other components of the hybrid system 100. In one variation, the WEG can also be circulated through an outer jacket of the eMachine 112 in order to cool the eMachine 112. Although the hybrid system 100 has been described with respect to a WEG coolant, other types of antifreezes and cooling fluids, such as water, alcohol solutions, etc., can be used. With continued reference to FIG. 1, the cooling system 122 includes a fluid radiator 124 that cools the fluid for the hybrid module 104. The cooling system 122 further includes a main radiator 126 that is configured to cool the antifreeze for various other components in the hybrid system 100. Usually, the main radiator 126 is the engine radiator in most vehicles, but the main radiator 126 does not need to be the engine radiator. A cooling fan 128 flows air through both fluid radiator 124 and main radiator 126. A circulating or coolant pump 130 circulates the antifreeze to the main radiator 126. It should be recognized that other various components besides the ones illustrated can be cooled using the cooling system 122. For instance, the transmission 106 and/or the engine 102 can be cooled as well via the cooling system 122.

The eMachine 112 in the hybrid module 104, depending on the operational mode, at times acts as a generator and at other times as a motor. When acting as a motor, the eMachine 112 draws alternating current (AC). When acting as a generator, the eMachine 112 creates AC. An inverter 132 converts the AC from the eMachine 112 and supplies it to an energy storage system 134. The eMachine 112 in one example is an HVH410 series electric motor manufactured by Remy International, Inc. of Pendleton, Ind., but it is envisioned that other types of eMachines can be used. In the illustrated example, the energy storage system 134 stores the energy and resupplies it as direct current (DC). When the eMachine 112 in the hybrid module 104 acts as a motor, the inverter 132 converts the DC power to AC, which in turn is supplied to the eMachine 112. The energy storage system 134 in the illustrated example includes three energy storage modules 136 that are daisy-chained together to supply high voltage power to the inverter 132. The energy storage modules 136 are, in essence, electrochemical batteries for storing the energy generated by the eMachine 112 and rapidly supplying the energy back to the eMachine 112. The energy storage modules 136, the inverter 132, and the eMachine 112 are operatively coupled together through high voltage wiring as is depicted by the line illustrated in FIG. 1. While the illustrated example shows the energy storage system 134 including three energy storage modules 136, it should be recognized that the energy storage system 134 can include more or less energy storage modules 136 than is shown. Moreover, it is envisioned that the energy storage system 134 can include any system for storing potential energy, such as through chemical means, pneumatic accumulators, hydraulic accumulators, springs, thermal storage systems, flywheels, gravitational devices, and capacitors, to name just a few examples.

High voltage wiring connects the energy storage system 134 to a high voltage tap 138. The high voltage tap 138 supplies high voltage to various components attached to the vehicle. A DC-DC converter system 140, which includes one or more DC-DC converter modules 142, converts the high voltage power supplied by the energy storage system 134 to a lower voltage, which in turn is supplied to various systems and accessories 144 that require lower voltages. As illustrated in FIG. 1, low voltage wiring connects the DC-DC converter modules 142 to the low voltage systems and accessories 144.

The hybrid system 100 incorporates a number of control systems for controlling the operations of the various components. For example, the engine 102 has an engine control module (ECM) 146 that controls various operational characteristics of the engine 102 such as fuel injection and the like. A transmission/hybrid control module (TCM/HCM) 148 substitutes for a traditional transmission control module and is designed to control both the operation of the transmission 106 as well as the hybrid module 104. The transmission/hybrid control module 148 and the engine control module 146 along with the inverter 132, energy storage system 134, and DC-DC converter system 140 communicate along a communication link as is depicted in FIG. 1.

To control and monitor the operation of the hybrid system 100, the hybrid system 100 includes an interface 150. The interface 150 includes a shift selector 152 for selecting whether the vehicle is in drive, neutral, reverse, etc., and an instrument panel 154 that includes various indicators 156 of the operational status of the hybrid system 100, such as check transmission, brake pressure, and air pressure indicators, to name just a few.

As noted before, the hybrid system 100 is configured to be readily retrofitted to existing vehicle designs with minimal impact to the overall design. All of the systems including, but not limited to, mechanical, electrical, cooling, controls, and hydraulic systems, of the hybrid system 100 have been configured to be a generally self-contained unit such that the remaining components of the vehicle do not need significant modifications. The more components that need to be modified, the more vehicle design effort and testing is required, which in turn reduces the chance of vehicle manufacturers adopting newer hybrid designs over less efficient, preexisting vehicle designs. In other words, significant modifications to the layout of a preexisting vehicle design for a hybrid retrofit require, then, vehicle and product line modifications and expensive testing to ensure the proper operation and safety of the vehicle, and this expense tends to lessen or slow the adoption of hybrid systems. As will be recognized, the hybrid system 100 not only incorporates a mechanical architecture that minimally impacts the mechanical systems of pre-existing vehicle designs, but the hybrid system 100 also incorporates a control/electrical architecture that minimally impacts the control and electrical systems of pre-existing vehicle designs.

Further details regarding the hybrid system 100 and its various subsystems, controls, components and modes of operation are described in Provisional Patent Application No. 61/381,615, filed Sep. 10, 2010, which is hereby incorporated by reference in its entirety.

Figure 2:
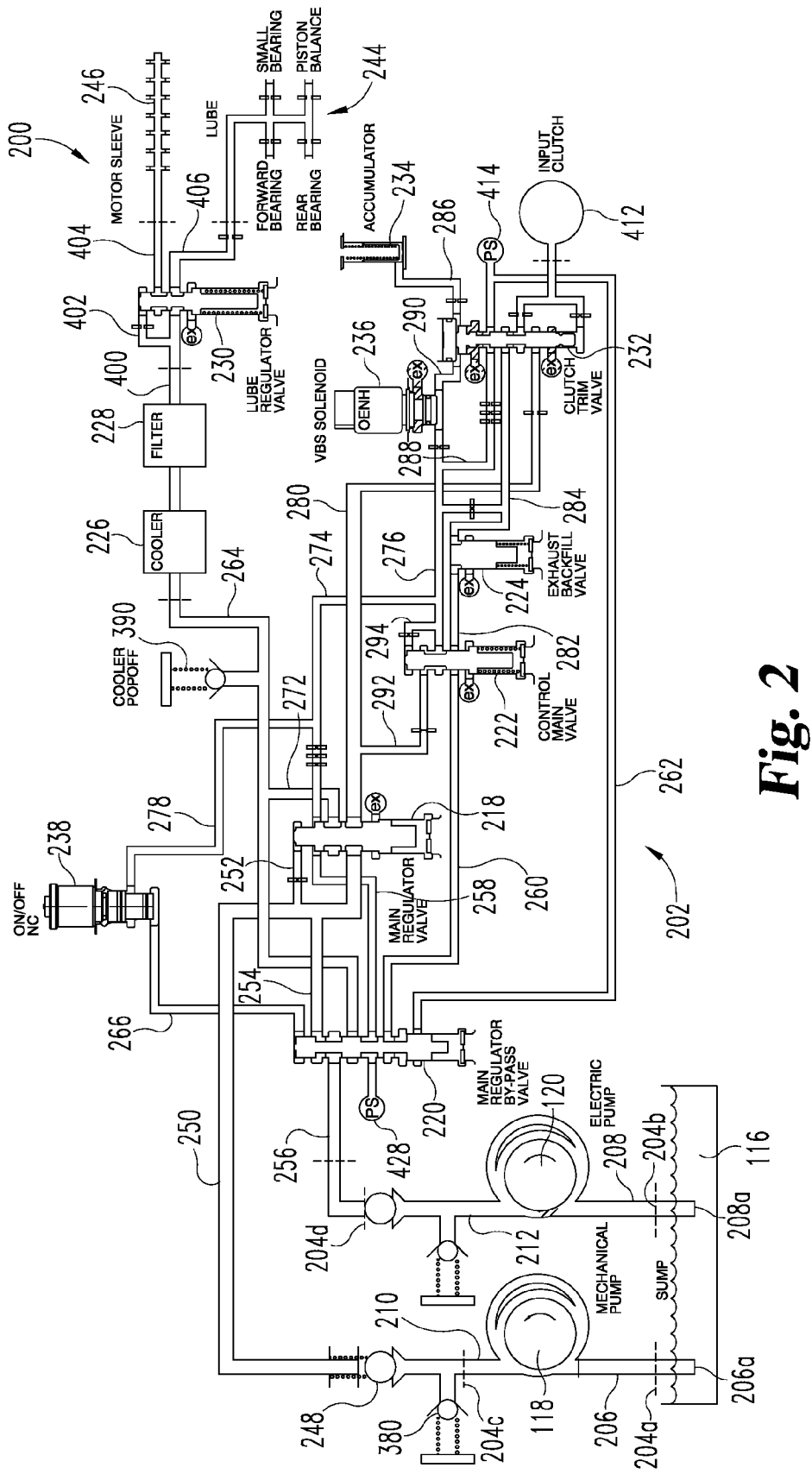
FIG. 2 illustrates a diagrammatic view of one hydraulic system suitable for use in the FIG. 1 hybrid system.

Referring to FIG. 2, there is illustrated in diagrammatic form a hydraulic system 200 which is suitably constructed and arranged for use with hybrid system 100. More particularly, hydraulic system 200 is a portion of hybrid module 104. Since the FIG. 2 illustration includes components which interface with a sump module assembly 202, broken lines 204 are used in FIG. 2 to denote, in diagrammatic form, the functional locations of the oil connections from other hydraulic components to the sump module assembly 202. Lower case letters are used in conjunction with reference numeral 204 in order to distinguish the various broken line locations (204a, 204b, etc.). For example, the sump 116 is part of the sump module assembly 202, while mechanical pump 118 and electric pump 120 are not technically considered to be actual component parts of the sump module assembly 202, through this convention is somewhat arbitrary. The mechanical pump 118 and the electric pump 120 each have an oil connection with the sump module assembly 202. Sump 116 is independent of the sump for the automatic transmission 106. Broken line 204a diagrammatically illustrates the location of flow communication between the mechanical pump inlet conduit 206 and sump 116. Similarly, broken line 204b denotes the location of flow communication between the electric pump inlet conduit 208 and sump 116. Inlet conduit 206 defines inlet conduit opening 206a. Inlet conduit 208 defines inlet conduit opening 208a.

On the flow exiting sides of the two oil pumps, broken line 204c denotes the location where the outlet 210 of mechanical pump 118 is in flow connection (and flow communication with the sump module assembly 202. Broken line 204d denotes the location where the outlet 212 of the electric pump 120 is in flow connection (and flow communication) with the sump module assembly 202. This broken line convention is used throughout the FIG. 2 illustration. However, this convention is simply for convenience in explaining the exemplary embodiment and is not intended to be structurally limiting in any manner. While the other components which have flow connections to the sump module assembly 202 are not technically considered part of the sump module assembly, these other components, such as the mechanical pump 118 and the electric pump 120, are considered part of the overall hydraulic system 200.

With continued referenced to FIG. 2, hydraulic system 200 includes a main regulator valve 218, main regulator by-pass valve 220, control main valve 222, exhaust back fill valve 224, cooler 226, filter 228, lube splitter valve 230, clutch trim valve 232, accumulator 234, solenoid 236, and solenoid 238. It will be appreciated that these identified component parts and subassemblies of hydraulic system 200 are connected with various flow conduits and that pop off valves are strategically positioned to safeguard against excessive pressure levels. Further, downstream from the lube splitter valve 230 are illustrated elements which are intended to receive oil. The first priority of the available oil at the lube splitter valve 230 is for lubrication and cooling of bearings 244 and gears or other accessories which are in need of cooling and lubrication. The second priority, once the first priority has been satisfied, is to deliver oil to motor sleeve 246.

The mechanical pump 118 is constructed and arranged to deliver oil to the main regulator valve 218 via conduit 250. One-way valve 248 is constructed and arranged for flow communication with conduit 250 and is positioned downstream from the mechanical pump 118. Valve 248 is constructed and arranged to prevent backwards flow when the engine and (accordingly) the mechanical pump are OFF. Valve 248 includes a ball and spring arrangement set at a threshold of 5 psi. Branch conduits 252 and 254 provide flow connections to the main regulator valve 218 and the main regulator by-pass valve 220, respectively. The electric pump 120 is constructed and arranged to deliver oil to the main regulator by-pass valve 220 via conduit 256. The main regulator by-pass valve 220 is in flow communication with main regulator valve 218 via conduit 258, with control main valve 222 via conduit 260, with clutch trim valve 232 via conduit 262, with cooler 226 via conduit 264 and with solenoid 238 via conduit 266.

The main regulator valve 218 is in flow communication with conduit 264 via conduit 272. Conduit 274 is in flow communication with the main regulator valve 218 and connects to conduit 276 which extends between control main valve 222 and solenoid 236. Branch conduit 278 establishes a flow path between conduit 274 and solenoid 238. Conduit 280 establishes flow communication between main regulator valve 218 and clutch trim valve 232. Conduit 282 establishes flow communication between control main valve 222 and exhaust back fill valve 224. Conduit 284 establishes flow communication between exhaust back fill valve 224 and clutch trim valve 232. Conduit 286 establishes flow communication between clutch trim valve 232 and accumulator 234. Conduit 288 establishes flow communication between clutch trim valve 232 and conduit 276. Conduit 290 establishes flow communication between solenoid 236 and clutch trim valve 232. Conduit 292 establishes a flow path (main) between conduit 280 and control main valve 222. Conduit 294 establishes a control branch flow connection between conduit 276 and control main valve 222. Other flow connections and conduits are illustrated in FIG. 2 and the corresponding flow path is readily apparent.

Considering the diagrammatic form of FIG. 2, it will be appreciated that the various flow connections and flow conduits may assume any one of a variety of forms and constructions so long as the desired oil flow can be achieved with the desired flow rate and the desired flow timing and sequence. The hydraulic system 200 description makes clear what type of oil flow is required between what components and subassemblies and the operational reason for each flow path. The hydraulic system 200 description which corresponds to what is illustrated in FIG. 2 is directed to what components and subassemblies are in oil flow communication with each other, depending on the hybrid system 100 conditions and the operational mode.

Before describing each of the three modes of operation applicable to hydraulic system 200, the relationship between and some of the construction details regarding the mechanical pump 118 and the electric pump 120 will be described. Understanding a few of the pump basics should facilitate a better understanding of the three modes of operation selected for further discussion regarding the overall hydraulic system.

Figure 3:
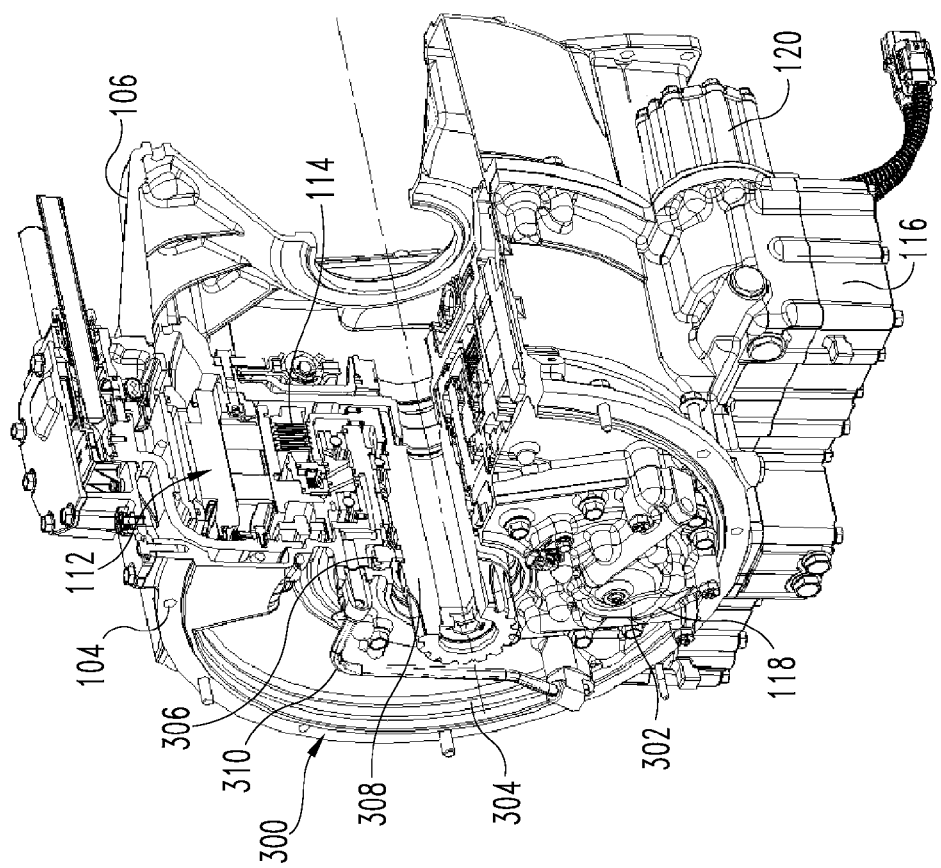
FIG. 3 is a perspective, partial cross-sectional view of a hybrid module-transmission subassembly.

Referring now to FIG. 3, a front perspective view is provided which includes a partial cross section through the hybrid module 104 from the perspective of the engine engagement side 300 of the hybrid module 104. On the engine engagement side 300, the hybrid module 104 has the mechanical pump 118 with a pump housing 302 that is secured to the hybrid module housing 304. A pump drive gear 306 which is secured to an input shaft 308 is used to drive the mechanical pump 118. The drive gear 306 in one example is secured to the input shaft 308 via a snap ring and key arrangement, but it is contemplated that the drive gear 306 can be secured in other manners. The mechanical pump 118 in conjunction with the electric pump 120 supplies fluid for lubrication, hydraulics, and/or cooling purposes to the hybrid module 104. By incorporating the electric pump 120 in conjunction with the mechanical pump 118, the mechanical pump 118 can be sized smaller, which in turn reduces the required space it occupies as well as reduces the cost associated with the mechanical pump 118. Moreover, the electric pump 120 facilitates lubrication even when the engine 102 is OFF. This in turn facilitates electric-only operating modes as well as other modes of the hybrid system 100. Both the mechanical pump 118 and the electric pump 120 recirculate fluid from the sump 116. The fluid is then supplied to the remainder of the hybrid module 104 via holes, ports, openings and other passageways traditionally found in transmissions for circulating oil and other fluids. A clutch supply port 310 supplies oil that hydraulically applies or actuates the clutch 114. In the illustrated embodiment, the clutch supply port 310 is in the form of a tube, but is envisioned it can take other forms, such as integral passageways within the hybrid module 104, in other examples.

The operation of the hybrid system 100 involves or includes various operational modes or status conditions, also referred to herein as "system modes" or simply "modes". The principal hybrid system 100 modes are summarized in Table 1 which is provided below:

TABLE 1

SYSTEM MODES

| Mode | Clutch | Motor | PTO | Transmission |
|---|---|---|---|---|
| Engine Start | Engaged | Motor | Inoperative | Neutral |
| Charge Neutral | Engaged | Generator | Inoperative | Neutral |
| eAssist Propulsion | Engaged | Motor | Inoperative | In Gear |
| eDrive | Disengaged | Motor | Inoperative | In Gear |
| Propulsion with Charge | Engaged | Generator | Inoperative | In Gear |
| Regeneration Charging | Disengaged | Generator | Inoperative | In Gear |
| No Charge Braking | Engaged | N/A | Inoperative | In Gear |
| PTO | Engaged | N/A | Operative | Neutral |
| ePTO | Disengaged | Motor | Operative | Neutral |

During an initialization and/or startup mode, the electric pump 120 is activated by the transmission/hybrid control module 148 so as to circulate fluid through the hybrid module 104. The electric pump 120 receives its power from the energy storage system 134 via the inverter 132 (FIG. 1). Once sufficient oil pressure is achieved, the clutch 114 is engaged. At the same time or before, the PTO is inoperative or remains inoperative, and the transmission 106 is in neutral or remains in neutral. With the clutch 114 engaged, the eMachine 112 acts as a motor and in turn cranks the engine 102 in order to start (i.e., spin/crank) the engine. When acting like a motor, the eMachine 112 draws power from the energy storage system 134 via the inverter 132. Upon the engine 102 starting, the hybrid system 100 shifts to a charge neutral mode in which the fuel is on to the engine 102, the clutch 114 is engaged, and the eMachine 112 switches to a generator mode in which electricity generated by its rotation is used to charge the energy storage modules 136. While in the charge neutral mode, the transmission remains in neutral.

From the charge neutral mode, the hybrid system 100 can change to a number of different operational modes. The various PTO operational modes can also be entered from the charge neutral mode. As should be understood, the hybrid system is able to move back and forth between the various operational modes. In the charge neutral mode, the transmission is disengaged, that is, the transmission is in neutral. Referring to Table 1, the hybrid system 100 enters a propulsion assist or eAssist propulsion mode by placing the transmission 106 in gear and having the eMachine 112 act as a motor.

During the eAssist propulsion mode, a PTO module is inoperative and the fuel to the engine 102 is on. In the eAssist propulsion mode, both the engine 102 and the eMachine 112 work in conjunction to power the vehicle. In other words, the energy to power the vehicle comes from both the energy storage system 134 as well as the engine 102. While in the eAssist propulsion mode, the hybrid system 100 can then transition back to the charge neutral mode by placing the transmission 106 back into neutral and switching the eMachine 112 to a generator mode.

From the eAssist propulsion mode, the hybrid system 100 can transition to a number of different operational states. For instance, the hybrid system 100 can transition from the eAssist propulsion mode to an electrical or eDrive mode in which the vehicle is solely driven by the eMachine 112. In the eDrive mode, the clutch 114 is disengaged, and the fuel to the engine 102 is turned off so that the engine 102 is stopped. The transmission 106 is placed in a driving gear. As the eMachine 112 powers the transmission 106, the PTO module is inoperative. While in the eDrive mode, the electric pump 120 solely provides the hydraulic pressure for lubricating the hybrid module 104 and controlling the clutch 114, because the mechanical pump 118 is not powered by the stopped engine 102. During the eDrive mode, the eMachine 112 acts as a motor. To return to the eAssist propulsion mode, the electric pump 120 remains on to provide the requisite back pressure to engage the clutch 114. Once the clutch 114 is engaged, the engine 102 is spun and fuel is turned on to power the engine 102. When returning to the eAssist propulsion mode from the eDrive mode, both the eMachine 112 and the engine 102 drive the transmission 106, which is in gear.

The hybrid system 100 also has a propulsion charge mode, a regenerative braking charge mode, and a compression or engine-braking mode. The hybrid system 100 can transition to the propulsion charge mode from the charge neutral mode, the eAssist propulsion mode, the regenerative braking charge mode, or the engine-braking mode. When in the propulsion charge mode, the engine 102 propels the vehicle while the eMachine 112 acts as a generator. During the propulsion charge mode, the clutch 114 is engaged such that power from the engine 102 drives the eMachine 112 and the transmission 106, which is in gear. Again, during the propulsion charge mode, the eMachine 112 acts as a generator, and the inverter 132 converts the alternating current produced by the eMachine 112 to direct current, which is then stored in the energy storage system 134. In this mode, the PTO module is in an inoperative state. While in the propulsion charge mode, the mechanical pump 118 generally handles most of the oil pressure and lubricant needs, while the electric pump 120 provides eMachine cooling. The load between the mechanical 118 and electric 120 pumps is balanced to minimize power loss.

The hybrid system 100 can transition to a number of operational modes from the propulsion charge mode. For example, the hybrid system 100 can transition to the charge neutral mode from the propulsion charge mode by placing the transmission 106 in neutral. The hybrid system 100 can return to the propulsion charge mode by placing the transmission 106 into gear. From the propulsion charge mode, the hybrid system 100 can also switch to the propulsion assist mode by having the eMachine 112 act as an electric motor in which electricity is drawn from the energy storage system 134 to the eMachine 112 such that the eMachine 112 along with the engine 102 drive the transmission 106. The regenerative charge mode can be used to recapture some of the energy that is normally lost during braking. The hybrid system 100 can transition from the propulsion charge mode to the regenerative charge mode by simply disengaging the clutch 114. In some instances, it may be desirable to use the engine-braking mode to further slow down the vehicle and/or to reduce wear of the brakes. Transitioning to the engine-braking mode can be accomplished from the propulsion charge mode by turning off the fuel to the engine 102. During the engine-braking mode, the eMachine 112 acts as a generator. The hybrid system 100 can return to the propulsion charge mode by turning back on the fuel to the engine 102. Simply disengaging the clutch 114 will then switch the hybrid system 100 to the regenerative charging mode.

The hybrid system 100 is able to conserve energy normally lost during braking by utilizing the regenerative braking/charge mode. During the regenerative charge mode, the clutch 114 is disengaged. The eMachine 112 acts as a generator while the transmission 106 is in gear. The power from the wheels of the vehicle is transferred through the transmission 106 to the eMachine 112, which acts as a generator to reclaim some of the braking energy and in turn helps to slow down the vehicle. The recovered energy via the inverter 132 is stored in the energy storage system 134. As noted in Table 1 above, during this mode the PTO module is inoperative.

The hybrid system 100 can transition from the regenerative charge mode to any number of different operational modes. For instance, the hybrid system 100 can return to the propulsion assist mode by engaging the clutch 114 and switching the eMachine 112 to act as a motor. From the regenerative charge mode, the hybrid system 100 can also return to the propulsion charge mode by engaging the clutch 114, and switching the eMachine 112 to the generator role. The hybrid system 100 can also switch to the engine-braking mode from the regenerative charge mode by turning off the fuel to the engine 102 and engaging the clutch. In addition to the regenerative braking mode, the hybrid system 100 can also utilize the engine-braking mode in which compression braking of the engine 102 is used to slow down the vehicle. During the engine braking mode, the transmission 106 is in gear, the PTO module is inoperative, and the eMachine 112 is acting as a generator so as to recover some of the braking energy, if so desired. However, during other variations of the engine-braking mode, the eMachine 112 does not need to act as a generator such that the eMachine 112 draws no power for the energy store system module 134. To transmit the energy from the vehicle's wheels, the engine clutch 114 is engaged and the power is then transmitted to the engine 102 while the fuel is off. In another alternative, a dual regenerative and engine braking mode can be used in which both the engine 102 and the eMachine 112 are used for braking and some of the braking energy from the eMachine 112 is recovered by the energy storage system module 134.

The hybrid system 100 can transition from the engine-braking mode to any number of different operational modes. As an example, the hybrid system 100 can switch from the engine-braking mode to the propulsion assist mode by turning on the fuel to the engine 102 and switching the eMachine 112 to act as an electric motor. From the engine-braking mode, the hybrid system 100 can also switch to the propulsion charge mode by turning back on the fuel to the engine 102. In addition, the hybrid system 100 can switch from the engine-braking mode to the regenerative charge mode by turning on the fuel to the engine 102 and disengaging the clutch 114.

When the PTO is used, the vehicle can be stationary or can be moving (e.g., for refrigeration systems). From the charge neutral mode, the hybrid system 100 enters a PTO mode by engaging the PTO. While in the PTO mode, the clutch 114 is engaged such that power from the engine 102 is transmitted to the now-operative PTO. During this PTO mode, the eMachine 112 acts as a generator drawing supplemental power from the engine 102 and transferring it via the inverter 132 to the energy storage system module 134. At the same time, the transmission 106 is in neutral so that the vehicle can remain relatively stationary, if desired. With the PTO operative, the ancillary equipment, such as the lift buckets, etc., can be used. The hybrid system 100 can return to the charge neutral mode by making the PTO inoperative.

During the PTO mode, the engine 102 is constantly running which tends to waste fuel as well as create unnecessary emissions in some work scenarios. Fuel can be conserved and emissions reduced from the hybrid system 100 by switching to an electric or ePTO mode of operation. When transitioning to the ePTO mode, the clutch 114, which transmits power from the engine 102, is disengaged and the engine 102 is stopped. During the ePTO mode, the eMachine 112 is switched to act as an electric motor and the PTO is inoperative. At the same time, the transmission 106 is in neutral and the engine 102 is stopped. Having the engine 102 turned off reduces the amount of emissions as well as conserves fuel. The hybrid system 100 can return from the ePTO mode to the PTO mode by continued operation of the electric 120 pump, engaging the clutch 114 and starting the engine 102 with the eMachine 112 acting as a starter. Once the engine 102 is started, the eMachine 112 is switched over to act as a generator and the PTO is able to operate with power from the engine 102.

With the operation or system modes of hybrid system 100 (see Table 1) in mind, the hydraulic system 200 is now further described in the context of three modes of operation. These three modes include an Electric Mode (eMode), a Transition Mode, and a Cruise Mode. From the perspective of the status and conditions of hydraulic system mode the eMode conditions are diagrammatically illustrated in FIG. 4. The Transition Mode conditions are diagrammatically illustrated in FIG. 5. The Cruise Mode conditions are diagrammatically illustrated in FIG. 6.

Figure 4:
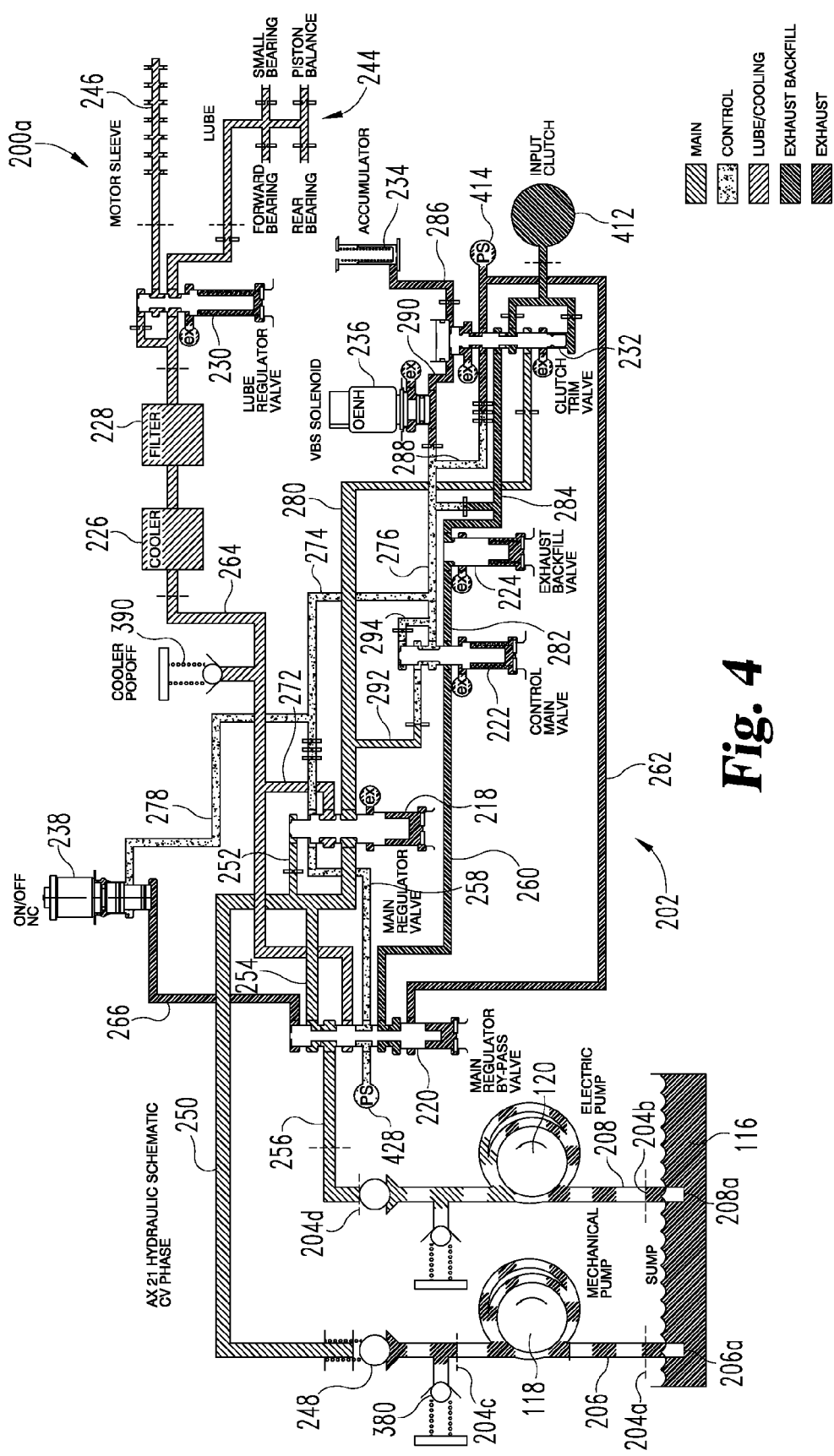
FIG. 4 illustrates a diagrammatic view of the FIG. 2 hydraulic system when the hydraulic system is in an eMode.

Referring first to FIG. 4, in the eMode condition, as represented by hydraulic system 200a, the engine and clutch are each in an "OFF" condition, and each solenoid 236 and 238 is an "OFF" condition. The electric pump 120 provides one hundred percent (100%) of the oil flow to the main regulator valve 218. With solenoid 238 in an "OFF" condition, there is no solenoid signal to the main regulator by-pass valve 220 and this component is also considered as being in an "OFF" condition. The main pressure is "knocked down" to 90 psi due to using only the electric pump 120 and considering its performance limitations. Any lube/cooling flow to the cooler 226 is the result of main regulator valve 218 overage.

Figure 5:
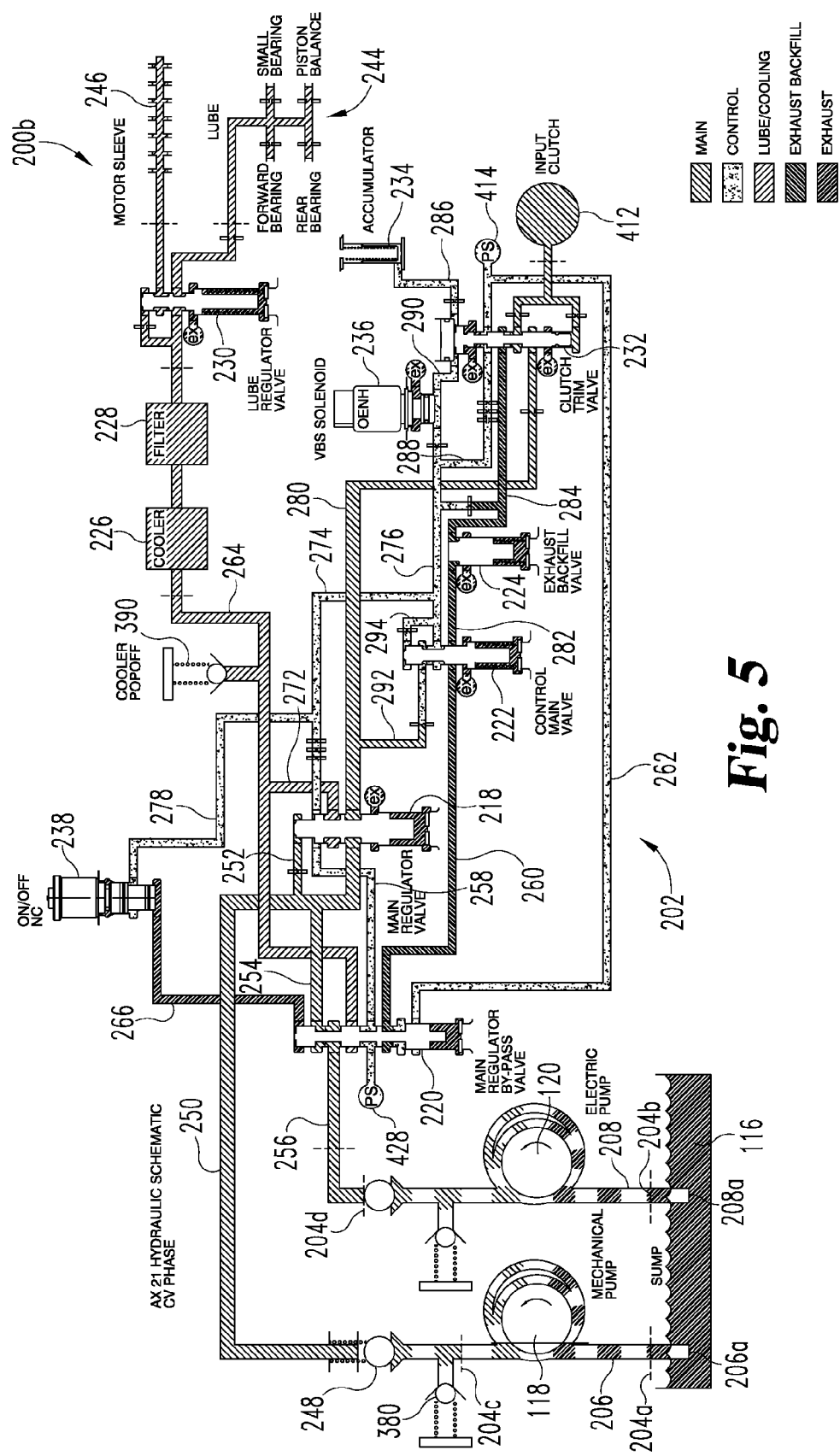
FIG. 5 illustrates a diagrammatic view of the FIG. 2 hydraulic system when the hydraulic system is in a Transition Mode.

Referring now to FIG. 5, in the Transition Mode condition as represented by hydraulic system 200b, the engine may be in either an "ON" or "OFF" condition, the clutch is in an "ON" condition, solenoid 238 is "OFF", and solenoid 236 is "ON". The electric pump 120 and the mechanical pump 118 can supply a flow of oil to the main regular valve 218. The main pressure is knocked down to 90 psi and any lube/cooling flow to the cooler 226 is the result of main regulator valve 218 overage.

Figure 6:
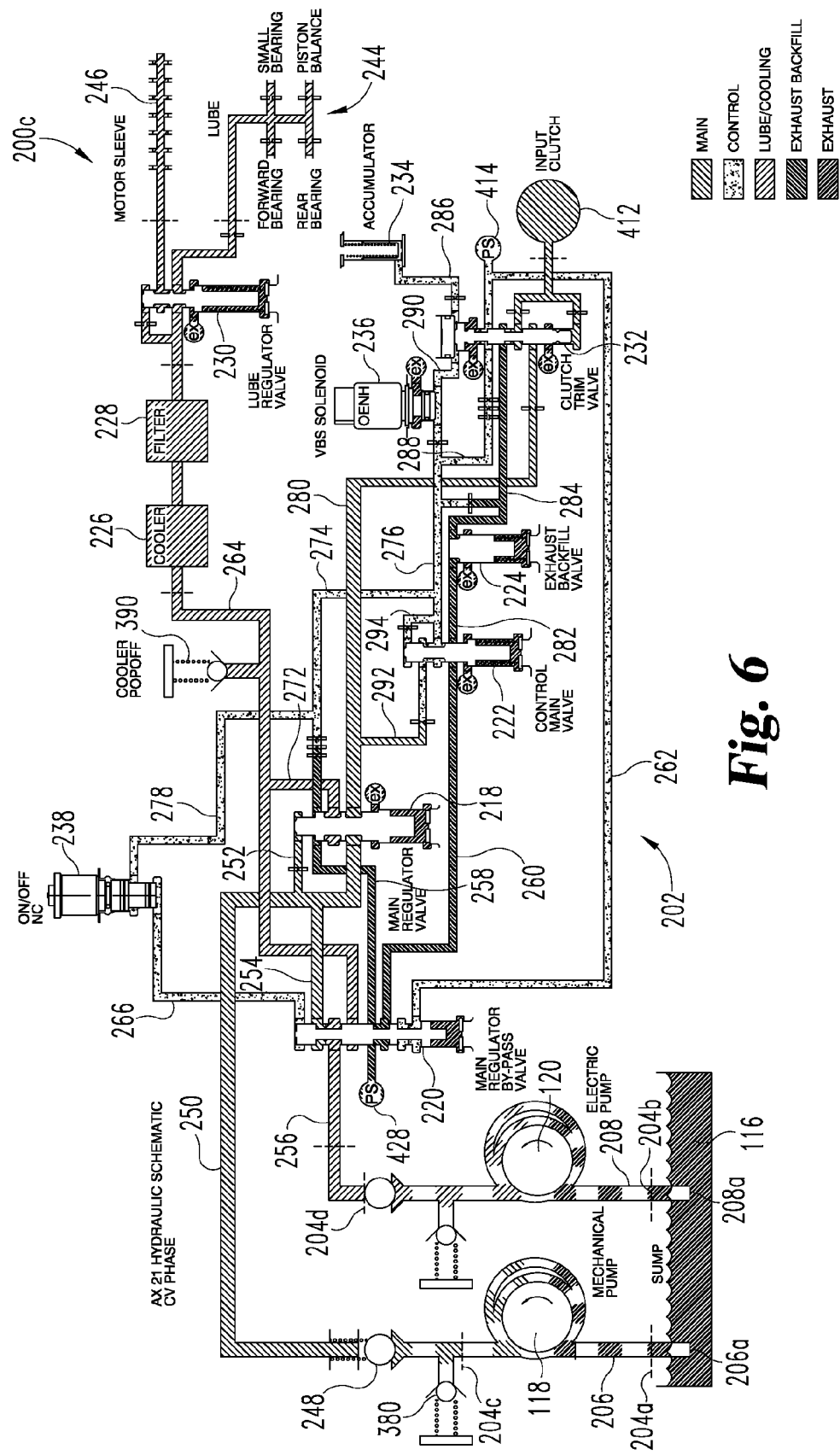
FIG. 6 illustrates a diagrammatic view of the FIG. 2 hydraulic system when the hydraulic system is in a Cruise Mode.

Referring now to FIG. 6, in the Cruise Mode, as represented by hydraulic system 200c, the engine and clutch are each in an "ON" condition, and each solenoid 236 and 238 is an "ON" condition. In this condition, the mechanical pump 118 provides one hundred percent (100%) of the oil flow to the main regulator valve 218 and to the clutch control hydraulics. The electric pump 120 provides supplemental cooler flow (or what may be referred to as cooler flow "boost"). The main pressure is at the "normal" (i.e., not knocked down) level of 205 psi. The flow to the cooler 226 is by way of the main regulator valve 218 overage and supplemented by flow from the electric pump 120.

The three modes which have been described and illustrated in FIGS. 4-6 have been identified in conjunction with hydraulic systems 200a, 200b, and 200c, respectively. This numbering scheme of letter suffixes is representative of the fact that the hardware, components, subassemblies, and conduits of hydraulic system 200 do not change with the different modes of operation. However, the operational status, the various ON/OFF conditions, etc. of the hardware, components, and subassemblies may change, depending on the particular item and the specific mode of operation.

While the three described modes for the hydraulic system 200 are based in part on the status or conditions of the engine, these modes are also based in part on the ON/OFF status of the referenced hardware, components, and subassemblies, including the mechanical pump 118 and the electric pump 120. The mechanical pump 118 is directly connected to the engine 102 such that when the engine is ON, the mechanical pump 118 is ON. When the engine 102 is OFF, the mechanical pump 118 is OFF. When ON, the mechanical pump 118 delivers oil to the entire hydraulic system. Any overage from the main regulator valve 218 is delivered to the cooler 226.

The ON/OFF status of the electric pump 120 and the speed of the electric pump 120 are controlled by the electronics of the hybrid module 104. The electric pump 120 delivers oil either to the hydraulic system 200 and/or to the cooler 226. When the mechanical pump 118 is either OFF or when its delivery of oil is insufficient, the electric pump 120 delivers oil to the hydraulic system. When the delivery of oil from the mechanical pump is sufficient, the electric pump 120 is able to be used for delivery of oil to the cooler for lube and motor cooling.

Reference has been made to the knocked down lower pressure level for certain operational modes. This knocked down pressure is associated with operation of the electric pump 120. Considering the various pressure levels and flow rates, the main pressure of the mechanical pump 118 is 205 psi. The main pressure of the electric pump 120 is 90 psi. For lube and cooling, the first 5.0 lpm of flow at approximately 30 psi is used for lube. Any excess flow up to approximately 15.0 lpm is delivered to the motor cooling sleeve 246. A maximum of 50 psi for the lube/cooling function is attained only after the motor cooling sleeve 240 is filled with oil. The clutch applied pressure is 205 psi nominal (1410 kPa) and 188 psi minimum (1300 kPa).

Figure 7:
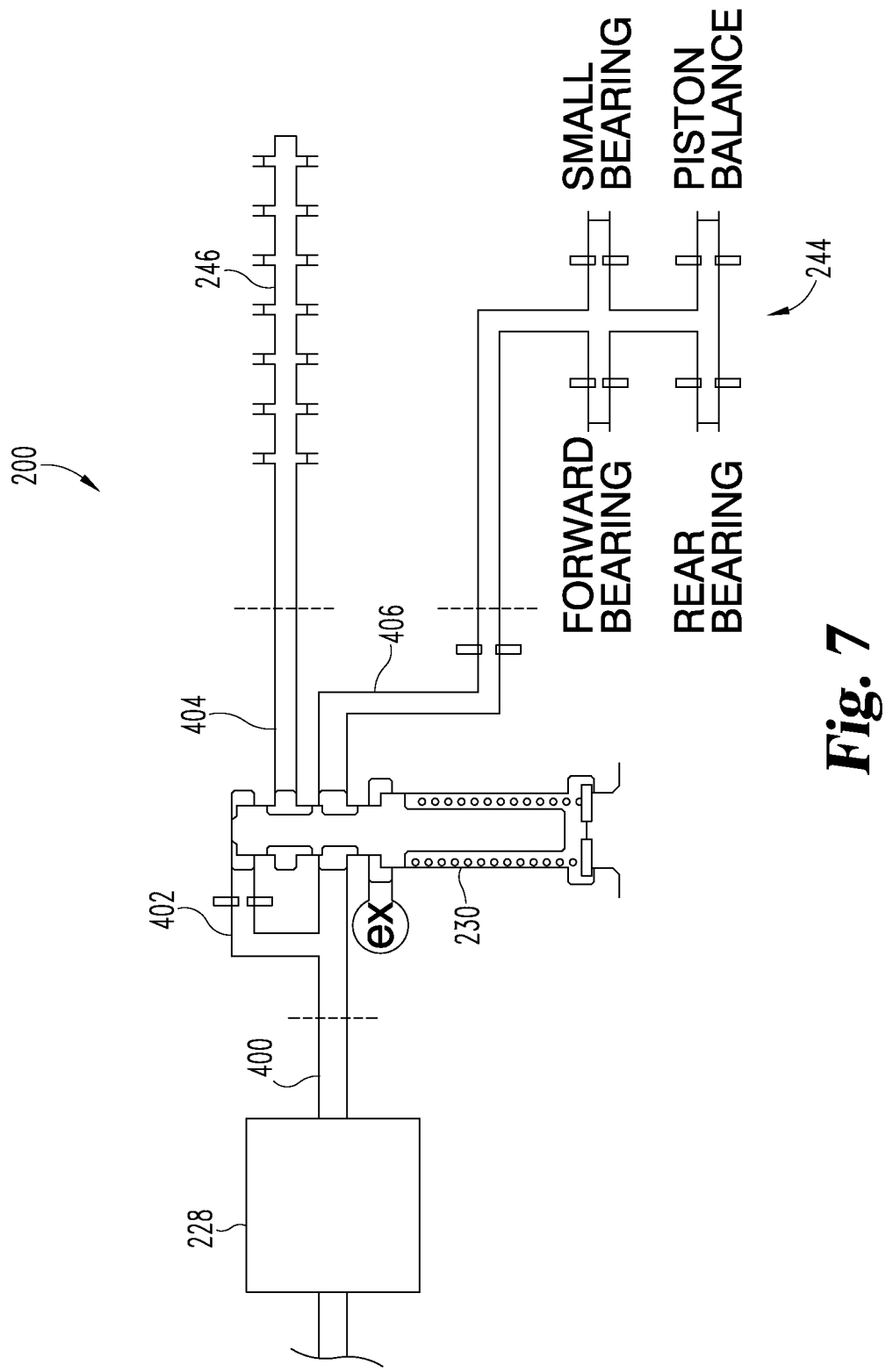
FIG. 7 is an enlarged portion of the FIG. 2 hydraulic system detailing the lube splitter valve portion.

Referring now to FIG. 7, an enlarged diagrammatic illustration of the lube splitter valve 230 is provided. Valve 230 may also be referred to as a lube regulation valve. As illustrated in FIG. 2, lube splitter valve 230 is positioned between the upstream filter 228 and the downstream motor sleeve 246 and bearing locations 244, as well as related components which require priority lube and cooling. Conduit 400 provides the flow connection between the filter 228 and the lube splitter valve 230. Branch conduit 402 provides lube feedback. Conduit 404 establishes a flow connection between the motor sleeve 246 and the lube splitter valve 230. Conduit 406 establishes a flow connection between those downstream components, such as bearings, which require lube and cooling, and the lube splitter valve 230.

Conduit 406 represents the primary output conduit for lube splitter valve 230. The downstream bearing locations 244 may also include gears and related components which require hydraulic fluid for either cooling or lubrication or both. Locations 244 represents a primary hydraulic fluid demand, such that the needs of locations 244 are to be met or satisfied first, before any noticeable amount of hydraulic fluid is delivered to the motor sleeve 246. Conduit 404 represents a secondary output conduit for lube splitter valve 230. Outside of any minor residual or trickle flow via conduit 404, the only noticeable flow of hydraulic fluid through conduit 404 for delivery to motor sleeve 246 is after the hydraulic fluid needs of locations 244 have been met or satisfied.

The main regulator valve 218, main regulator by-pass valve 220, control main valve 222, exhaust backfill valve 224, lube splitter valve 230, and clutch trim valve 232 each have a construction and arrangement which could be described, based on its construction and functionality, as a "spool valve". Each valve includes a valve body which defines an interior valve bore. Each valve also includes the use of a valve spool which is slidably disposed within the valve bore of the valve body. The selected cylindrical lands can be varied by diameter size, axial height, spacing, and relative location along the axis of the valve spool. The valve bore can also include sections with different diameters. Flow passages defined by the valve body connect to the various conduits, providing a predetermined and preselected arrangement of flow inputs and outputs, depending on incoming pressure levels and the positioning of the valve spool relative to the various flow passages. A more detailed description of this type of spool valve is provided in U.S. Pat. Nos. 7,392,892; 7,150,288; and 5,911,244. These three U.S. patent references are hereby incorporated by reference in their entirety as background technical information on the style and type of valve being used.

As would be understood from the construction and design philosophy of a spool valve, the incoming fluid pressure via conduit 400 (see FIG. 9) can influence the axial travel of the cylindrical lands, such as land 408. The downward axial travel of land 408 acts against coil spring 409. The requisite pressure level of the hydraulic fluid to cause movement of land 408 depends in part on the spring constant, something which can be set as part of the design of valve 230. The lands are unitized with shaft 410 such that axial movement of one land causes similar movement of the other lands. Similarly, as additional fluid pressure is applied to other lands, additional movement will occur. The biasing spring returns valve 230 to its normal condition when the elevated fluid pressure is removed.

The flow of oil to filter 228 is controlled, at least in part, by the pump speed and pump capacity, whether using the mechanical pump 118 or the electric pump 120 or a combination of the two pumps, all as would be dictated and controlled based on the particular operational mode. The amount of oil to be "delivered" by the lube splitter valve 230 to downstream locations depends in part on the initial design of hydraulic system 200 and in part on the anticipated demands of those downstream components and accessories in terms of the required lubrication and cooling. Since valve control is utilized, the "delivery" of oil is in the context of allowing or enabling passage through the valve. As used herein, "oil" is one type of hydraulic fluid and the system 200 described throughout is suitable for use with a variety of different hydraulic fluids.

As the flow of oil available to lube splitter valve 230 decreases due to particulate accumulation within filter 228, there may be an inability to fully meet all of the downstream demands for lubrication and cooling. While one design option could be to increase pump speed so as to deliver more oil, this would affect other portions of hydraulic system 200 which may not perform as intended with an increased pump speed. Further, there may be various inefficiencies in doing so which would detract from the economics and perhaps the reliability of the hybrid vehicle.

As noted, since there might be adverse consequences to other portions of hydraulic system 200 by increasing the pump speed, the construction and arrangement of lube splitter valve 230 prioritizes the delivery of the available oil to the forward and rear bearings, gears, and other accessories. This means that any reduced amount of oil only affects, at least initially, the amount which is received by the motor sleeve 246 and thus the motor of the eMachine. It is the design of the lube splitter valve 230 which recognizes a reduced amount of oil and prioritizes the split so as to try and fully satisfy the lubrication and cooling requirements of the forward and rear bearings, gears, and other accessories. The "shortage" in the amount of oil is first seen by the motor sleeve and ultimately the motor.

If the clogged filter issue is not addressed in a timely manner, it is conceivable that the reduced flow of oil will not be sufficient for the forward and rear bearings, gears, and other accessories (i.e. locations 244). However, before the amount of oil delivered to lube splitter valve 230 reaches this shortage level, an increase in motor (eMachine) temperature can be used (sensed) as an alert to the operator. In effect, by sensing the motor (eMachine) operating temperature, the operator can determine when the filter 228 needs to be replaced, or perhaps cleaned, depending on the style of filter being used. Once the filter 228 becomes clogged to the extent or degree that the amount of oil available to the motor sleeve 246 is unable to maintain a safe operating temperature for the motor (eMachine), it is time to replace or at least clean filter 228. As used herein, "clogged" means that there is a level of particulate accumulation within filter 228 which results in a reduction in the amount of oil delivered to lube splitter valve 230 which in turn allows a temperature rise in the motor which is deemed to be either of concern or unacceptable. Obviously, an "unacceptable" motor temperature is a temperature which is lower than a temperature at which motor damage could occur.

Figure 8:
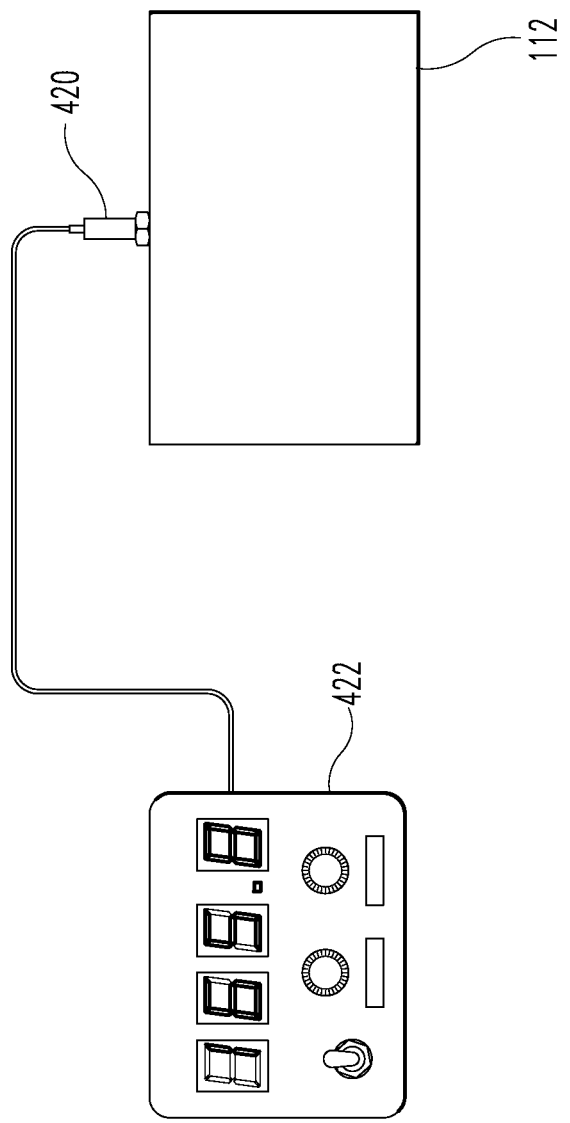
FIG. 8 is a diagrammatic illustration of a temperature sensor and display

There are two principle aspects of this portion of hydraulic system 200 which cooperate to permit the operator to safely detect a clogged filter condition. The first aspect is the construction and arranged of lube splitter valve 230 which prioritizes the flow split of the available oil to first satisfy the downstream requirements of those more critical components, including the forward and rear bearings, gears, and accessories. Whatever oil is left is routed to motor sleeve 246. The second aspect (see FIG. 8) is the use of a temperature sensor 420 in conjunction with the motor (eMachine) 112 and a display 422 or similar indicator of the temperature reading of the motor. This display 422 can be programmed with a threshold temperature and a warning indicator or alert when the internal motor temperature first reaches that programmed threshold temperature. It is envisioned that this threshold temperature would be adjustable, depending on the motor parameters, operating conditions, and operating environment.

Figure 9:
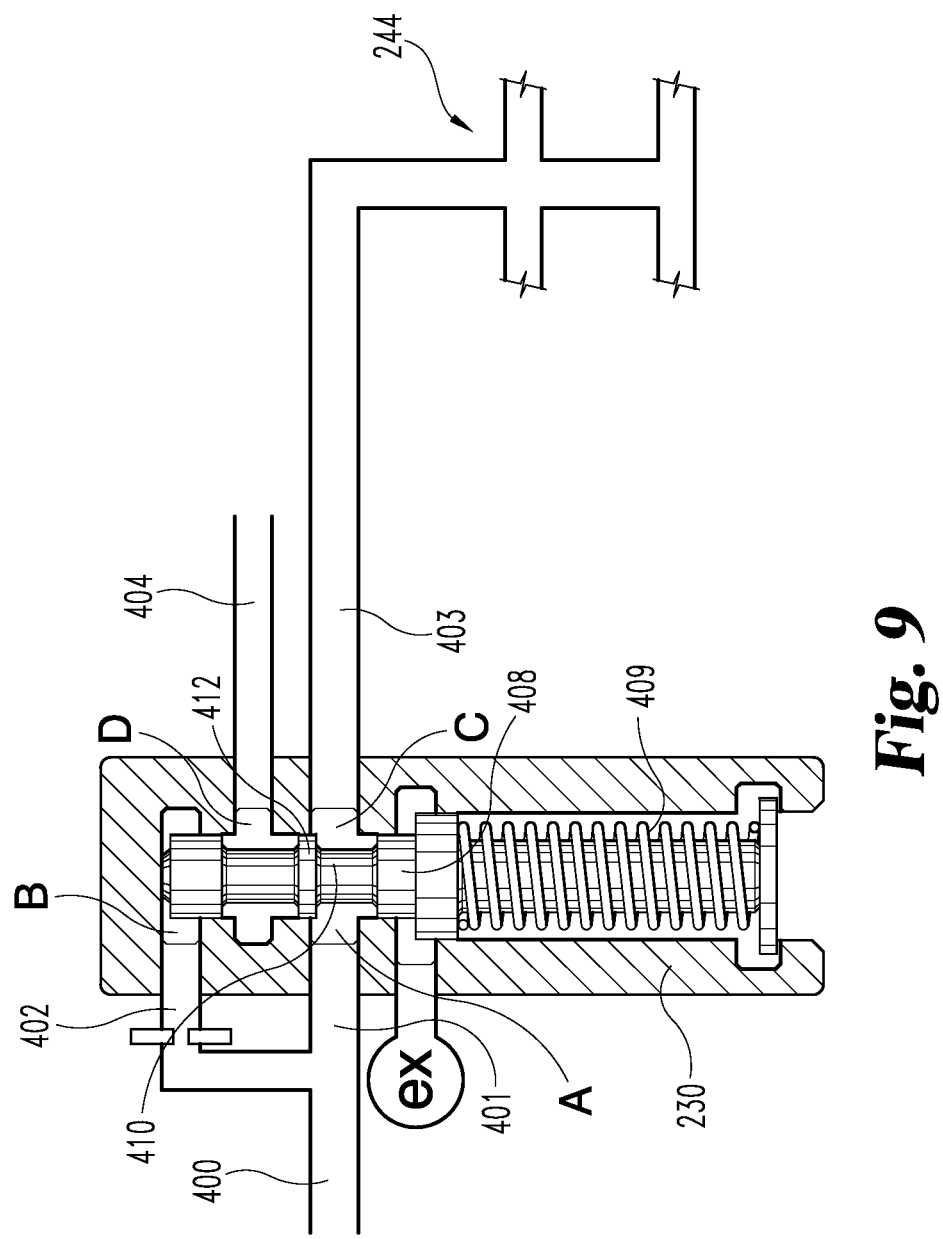
FIG. 9 is a diagrammatic illustration of the interior construction of the FIG. 7 lube splitter valve.

Referring to FIG. 9, the structural details of the interior of lube splitter valve 230 are illustrated. The initial flow of oil from filter 228 comes to lube splitter valve 230 via conduit 400. One branch 401 connects to port A while the other branch 402 connects to port B. The extra outlet port C connects to the downstream components via flow conduit 406. The exit or outlet port D connects to motor sleeve 246 via flow conduit 404. The FIG. 9 illustration represents the normal or static condition of the lube splitter valve 230. In this condition there is a flow path through the valve for fluid flow from conduit 400 to conduit 406. As such, all of the fluid flow out of filter 228 will pass through valve 230 to locations 244, until or unless an elevated fluid pressure is achieved which is capable of moving land 408 and thus shaft 410. If the fluid flow out of filter 228 is more than sufficient to satisfy the needs of locations 244, then an elevated pressure will be seen by land 408. This elevated pressure moves the shaft 410 and the other lands in a downward axial direction. This downward axial movement of land 412 creates an opening within valve 230 for fluid from conduit 400 to flow into conduit 404. This allows hydraulic fluid to be delivered to the motor sleeve 246 when there is an "excess" of hydraulic fluid. This "excess" means that there is more hydraulic fluid available from or through conduit 400 than is required by locations 244. Once the demand of locations 244 is satisfied, any additional or excess hydraulic fluid is able to be delivered to motor sleeve 246.

When the filter 228 becomes clogged such that the oil flow rate to the lube splitter valve 230 is slowed, the volume of oil flowing through conduit 400 is less and accordingly there is a lower pressure. In terms of the design parameters for lube splitter valve 230, the pressure which represents the target oil flow amount to the downstream components is not sufficient to move the land (i.e., overcome or exceed the valve spring force) such that oil flow goes to the motor sleeve. When the pressure is higher, which means less filter blockage and more oil, the land is moved and oil flow goes to the motor sleeve 246. When the oil flow to the motor (eMachine) is not sufficient to keep the motor temperature at or below the desired threshold temperature, the temperature sensor signals or triggers a warning indicator or alert to the operator by way of the display. The alert to the operator is to clean or replace the filter 228 as it has become clogged with particulate to the extent that a sufficient amount of hydraulic fluid is not being delivered.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. A hydraulic system for a hybrid vehicle, the hybrid vehicle including a motor, said hydraulic system comprising:
   a sump with a supply of hydraulic fluid;
   a network of valves and conduits;
   pump means for drawing hydraulic fluid from said sump and delivery of said hydraulic fluid to said network;
   a fluid filter positioned in said network;
   a control valve positioned in said network downstream from said fluid filter;
   a primary output conduit connected to said control valve for supplying hydraulic fluid to a primary demand;
   a secondary output conduit connected to said control valve for supplying hydraulic fluid to a secondary demand, wherein said control valve is constructed and arranged to supply hydraulic fluid to said secondary demand only after said primary demand is satisfied; and
   temperature monitoring means for monitoring an internal temperature of said motor and for determining if the fluid flow out of said fluid filter satisfies said primary demand.

2. The hydraulic system of claim 1 wherein said pump means includes a parallel arrangement of a mechanical pump and an electric pump.

3. The hydraulic system of claim 2 wherein said primary demand includes the delivery of hydraulic fluid to bearings of said hybrid vehicle.

4. The hydraulic system of claim 3 wherein said secondary demand includes the delivery of hydraulic fluid to a motor sleeve which is in flow communication with a motor of said hybrid vehicle.

5. The hydraulic system of claim 4 wherein said control valve is constructed and arranged as a spool valve.

6. The hydraulic system of claim 5 wherein said temperature monitoring means further includes a temperature sensor constructed and arranged to sense an internal temperature of said motor.

7. The hydraulic system of claim 6 which further includes a display unit which is constructed and arranged in data communication with said temperature sensor for display of said internal temperature.

8. The hydraulic system of claim 7 wherein said display unit is programmed with a threshold temperature.

9. The hydraulic system of claim 8 wherein said threshold temperature is adjustable.

10. The hydraulic system of claim 9 wherein said display unit is constructed and arranged to provide a warning when said internal temperature reaches said threshold temperature.

11. The hydraulic system of claim 1 wherein said primary demand includes the delivery of hydraulic fluid to bearings of said hybrid vehicle.

12. The hydraulic system of claim 1 wherein said secondary demand includes the delivery of hydraulic fluid to a motor sleeve which is in flow communication with a motor of said hybrid vehicle.

13. The hydraulic system of claim 1 wherein said control valve is constructed and arranged as a spool valve.

14. The hydraulic system of claim 1 wherein said temperature monitoring means further includes a temperature sensor constructed and arranged to sense an internal temperature of said motor.

15. The hydraulic system of claim 14 which further includes a display unit which is constructed and arranged in data communication with said temperature sensor for display of said internal temperature.

16. A hydraulic system for a vehicle, the vehicle including a motor, said hydraulic system comprising:
a sump with a supply of fluid;
an arrangement of valves and conduits;
pump means for drawing fluid from said sump and delivery of said fluid to said arrangement;
a filter positioned in said arrangement;
a valve positioned in said arrangement downstream from said filter;
a first output conduit connected to said valve for supplying fluid to a first demand; and
a second output conduit connected to said valve for supplying fluid to a second demand, wherein said valve is constructed and arranged to supply fluid to said second demand only after said first demand has been met as determined by the temperature monitoring means which controls the operation of said valve based on the temperature of the motor.

17. The hydraulic system of claim 16 wherein said first demand includes the delivery of fluid to said motor.

18. The hydraulic system of claim 17 wherein said second demand includes the delivery of fluid to a motor sleeve which is in flow communication with said motor of said vehicle.

19. A method of determining a clogged fluid filter condition within a hydraulic system which is associated with a hybrid vehicle, the hybrid vehicle including a motor, said method comprising the following steps:
providing a fluid filter as a part of said hydraulic system;
providing a control valve downstream from said fluid filter as part of said hydraulic system, said control valve being in flow communication with said fluid filter;
providing a primary output conduit connected to said control valve for supplying hydraulic fluid to a primary demand;
providing a secondary output conduit connected to said control valve for supplying hydraulic fluid to a secondary demand;
providing a temperature sensor to sense an internal temperature of said motor;
monitoring said temperature sensor for monitoring an internal temperature of said motor and for determining if the fluid flow out of said fluid filter satisfies the primary demand; and
wherein said control valve is constructed and arranged for supplying hydraulic fluid to said secondary demand only after satisfying said primary demand.

20. The method of claim 19 which further includes the step of setting a target internal motor temperature which is representative of adequate hydraulic fluid flow out of said fluid filter.

21. The method of claim 20 which further includes the step of comparing said internal motor temperature to said target internal motor temperature as a means to determine when said hydraulic fluid flow out of said fluid filter is not adequate.

22. A method of determining a clogged fluid filter condition within a hydraulic system which is associated with a hybrid vehicle, the hybrid vehicle including a motor, said method comprising the following steps:
providing a fluid filter as a part of said hydraulic system;
providing a control valve downstream from said fluid filter as part of said hydraulic system, said control valve being in flow communication with said fluid filter;
providing a primary output conduit connected to said control valve for supplying hydraulic fluid to a primary demand;
providing a secondary output conduit connected to said control valve for supplying hydraulic fluid to a secondary demand;
setting a target internal motor temperature which is representative of adequate hydraulic fluid flow out of said fluid filter;
connecting a temperature sensor to said motor for determining said internal motor temperature;
monitoring the internal motor temperature; and
comparing said internal motor temperature to said target internal motor temperature as a means to determine when said hydraulic fluid flow out of said fluid filter is not adequate.

23. The method of claim 22 wherein said secondary demand includes a motor sleeve.

24. The method of claim 22 wherein said primary demand includes bearings.

25. The method of claim 22 wherein said control valve is a spool valve.

* * * * *